June 7, 1932.   J. A. ROCHE   1,861,938
ADJUSTABLE SEAT
Filed Jan. 18, 1926
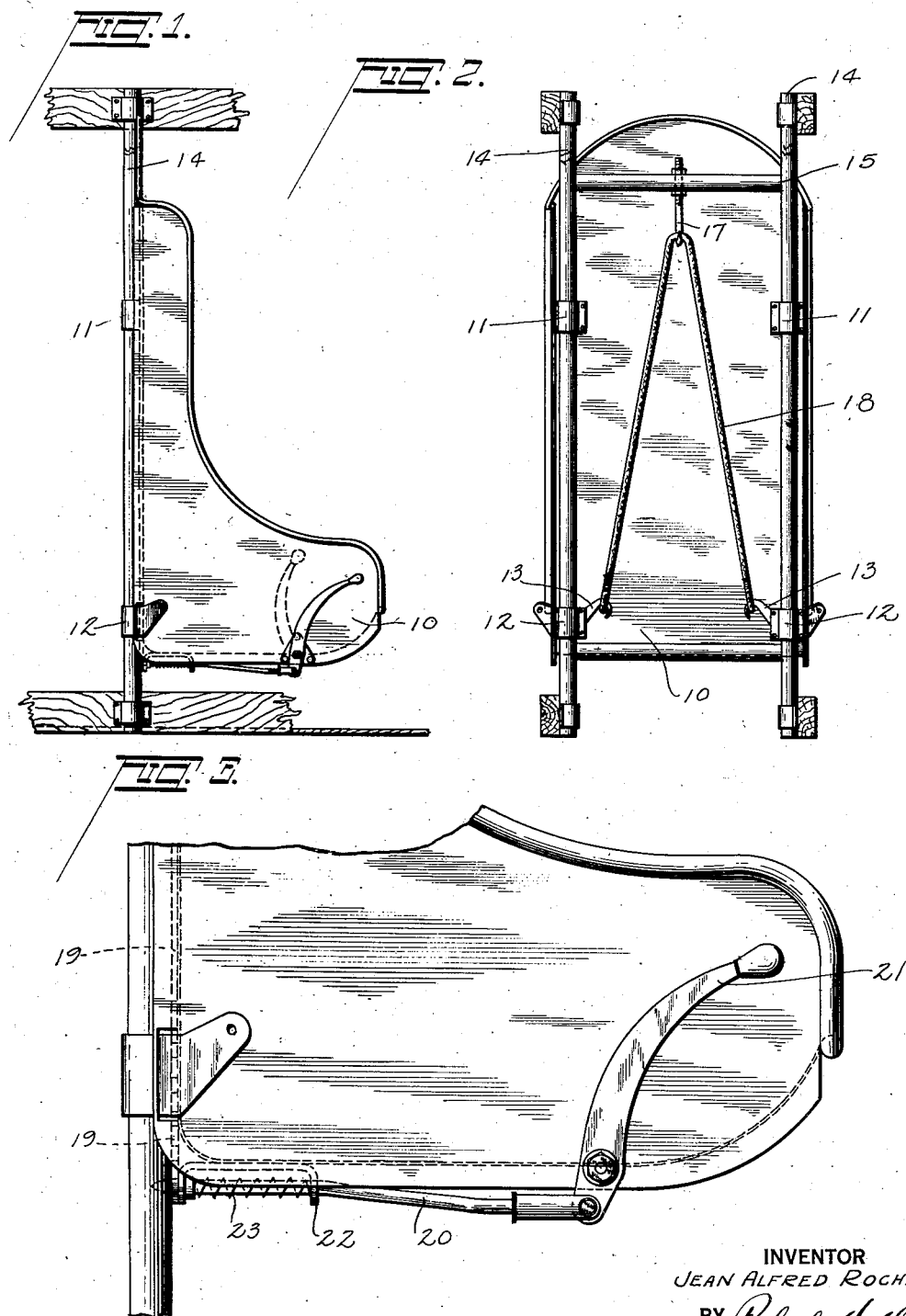
INVENTOR
JEAN ALFRED ROCHE
BY
ATTORNEY Patented June 7, 1932

1,861,938

UNITED STATES PATENT OFFICE

JEAN ALFRED ROCHÉ, OF DAYTON, OHIO

ADJUSTABLE SEAT

Application filed January 18, 1926. Serial No. 82,102.

This invention relates to an adjustable seat. The object of this invention is to provide a seat which is easily adjustable in a vertical plane to any desired position, the movement downward being effected merely by releasing a locking mechanism and then forcing it downward by the weight of a person sitting therein, and the movement upward being accomplished by the force exerted by a resilient element, when the lock is released and the person rises from the seat.

Another object of this invention resides in the particular construction of the seat for use in the cockpit of airplanes or similar places wherein compactness is an essential feature, and wherein space must be provided for various controls. In my construction, an open space under the seat has been left open for this purpose.

Although the ultimate purpose of this invention is to provide an adjustable seat as stated, the particular inventive act resides in the manner and mode of employing the resilient element to effect this purpose. To this end, I have provided a seat or chair made from light material such as aluminum, the seat proper being concave in the center and convex or cylindrical on the outward edge. A high back is provided with two pairs of bracket members, one upper and one lower pair, the lower pair being provided with hooks. A frame for supporting the chair is composed of uprights, upon which the brackets slide, and cross members, the upper one of which is provided with an adjustable hook. The ends of a strong rubber cord are looped over the hooks on the lower pair of brackets and the center extends over the adjustable loop on the cross member. By means of this adjustable hook, the rubber cord is placed under a tension so that the seat is always drawn to its highest position unless otherwise restrained. For this purpose, I have provided a lever actuated locking arm which engages with any one of a number of holes placed progressively in one of the uprights. To lower the seat, the lever is depressed, which disengages the arm, and the seat is lowered by the operator sitting in it. It is evident that the rubber cord acts as a cushion in this operation. When the seat has been lowered to the desired position, the lever is released and the seat locked in place. If it is desired to raise the seat, the operator merely depresses the lever, thus permitting the rubber cord to contract.

This embodiment of my invention is fully illustrated in the accompanying drawing in which—

Fig. 1 is a side view of the chair,
Fig. 2 is a rear view of Fig. 1, and
Fig. 3 is a detail side view of the lever actuated locking arm.

In the drawing, 10 indicates the seat to which is riveted or bolted an upper pair of brackets 11 and a lower pair 12. The lower pair is provided with hooks 13. These brackets are slidably mounted on the uprights 14 of a frame. The frame is provided with an upper cross member 15 and a lower cross member 16, the upper cross member being provided with an adjustable hook 17. The ends of a strong rubber cord 18 are attached to the hooks 13, and extends over the hook 17. The upper cross members limit the upward movement of the seat by contacting with the upper brackets 11, and the lower cross member limits the downward movement by similarly contacting with the lower brackets 12. When the seat is used in the cockpit of airplanes, the lower cross member is so placed that a space is provided under the seat wherein various control rods may be placed. One of the uprights is provided with a series of progressively spaced holes 19, which are adapted to receive an arm 20 which is actuated by a lever 21 pivoted to the chair in some convenient place. The arm is provided with a guide 22 carried by the chair and a spring 23 keeps the arm in engagement with the selected hole.

It is obvious that changes in the structure may be made to increase the strength of the frame, the resilient cord, locking means, and other elements; and this invention is not limited to the particular structural features set forth.

It is also within the spirit of this invention to entirely change the resilient means from an elastic cord as set forth to an oil or air cylinder performing the same function as the cord.

Having thus fully described my invention, what I claim as new is:

1. A chair of light material for aircrafts, a seat, a high back provided with two pairs of bracket members, the lower pair of which are provided with hooks, a frame, means for sustaining the frame in an upright position and comprising two uprights slidably engaging the brackets, and one of which is provided with stops, upper and lower cross members for the uprights, the upper cross member being provided with an adjustable hook, said cross member being so spaced and located that it limits the extent of movement of the chair by engaging with the upper and lower bracket members respectively, an elastic cord, the ends of which are looped to engage the hooks of the lower bracket members and extending over the adjustable hook of the upper cross member, a lever pivoted to the chair near its base and on the side, an arm actuated by the lever, and a guide therefor, whereby the arm may be engaged or disengaged with one of the stops.

2. In combination with the hull of an aircraft having upright members extending from the top to the bottom of said hull, a seat slidably mounted on said uprights, resilient means for suspending said seat and operative to move the seat bodily along said uprights to bodily elevate said seat substantially to its uppermost position on said uprights and releasable means for locking said seat to said uprights in various positions of adjustment.

3. In combination with the hull of an aircraft having substantially vertically disposed supporting members extending substantially from top to the bottom of said hull, a seat slidably movable on said members, yieldable means for suspending said seat and operative to move said seat bodily along said uprights to bodily elevate said seat with such force as to require the weight of a person sitting therein to cause downward movement and releasable means carried by said seat for locking said seat to said uprights in various positions of adjustment along said supporting members.

4. An adjustable seat for use by a pilot in an aircraft having upright supporting members and a seat slidably mounted on said uprights, resilient means for suspending said seat and operative to elevate said seat and pilot along said uprights to substantially its uppermost position on said supporting members, tensioning devices whereby tension of said resilient means may be adjusted, and releasable means for locking said seat to said uprights in various positions of adjustment.

5. An adjustable seat for use by a pilot in an aircraft comprising a seat mounting having substantially vertically disposed guides, a seat mounted to slide vertically on said guides, resilient means between said seat and said mounting suspending said seat and adapted to elevate said seat and pilot to substantially its uppermost position on said guides, and means for releasably locking said seat in relation to said seat mounting in various positions of adjustment.

6. In an airplane construction, a pilot's cockpit, a pair of laterally spaced tubular supports extending upwardly in a vertical direction from the floor of the fuselage, a seat slidably mounted on said supports, resilient means suspending said seat from said support and operative to move said seat along said supports to substantially its uppermost position, said seat having a pair of brackets secured to each side thereof in which the supporting tubes are disposed, a series of openings in one of said tubes, and a hand operable lever pivotally mounted at the side of said seat, said lever having a plunger attached thereto adapted to enter any one of the openings in said tube, whereby a pull on said lever will release said plunger from the opening in which it is inserted so that the seat may be adjusted to any one of several positions along said tube.

7. In an airplane construction, a pilot's cockpit, a pair of laterally spaced tubular supports extending upwardly in a vertical direction from the floor of the fuselage, a seat slidably mounted on said supports, resilient means between said seat and said supports, said resilient means suspending said seat from said supports and being operative to move said seat along said supports to substantially its uppermost position, said seat having a pair of brackets secured to each side thereof in which the supporting tubes are disposed, a series of openings in one of said tubes, and a hand operable lever pivotally mounted at the side of said seat, said lever having a plunger pivotally connected therewith and adapted to enter any one of the openings in said tube, whereby a pull on said lever will release said plunger from the opening in which it is inserted so that the seat may be adjusted to any one of several positions along said tube.

In testimony whereof I affix my signature.

JEAN ALFRED ROCHÉ.